United States Patent Office 3,316,473
Patented Apr. 25, 1967

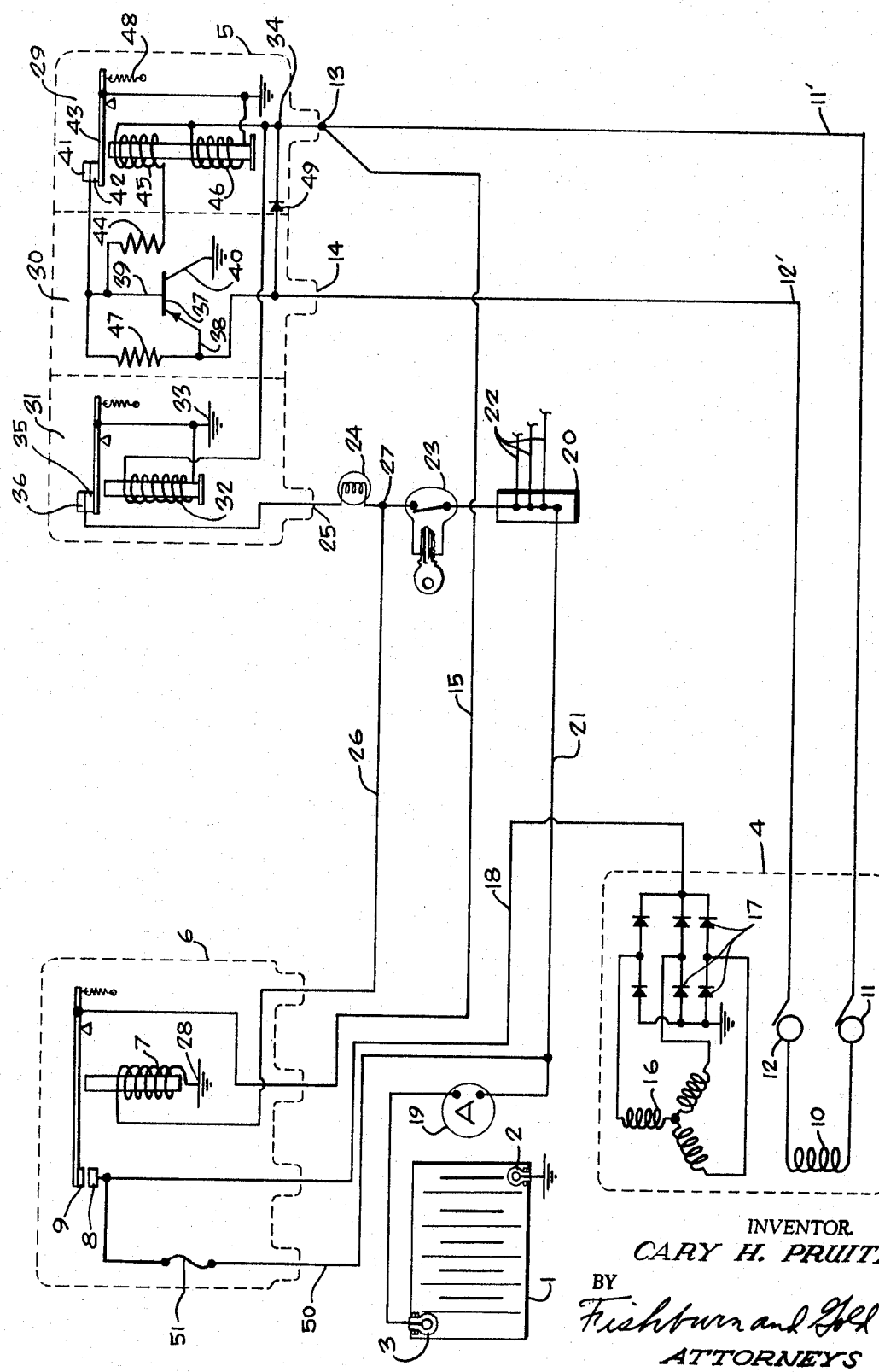

3,316,473
AUTOMOTIVE CIRCUIT PROTECTOR
Cary H. Pruitt, 114 E. Okmulgee,
Muskogee, Okla. 74401
Filed Oct. 28, 1963, Ser. No. 319,127
3 Claims. (Cl. 320—61)

This invention relates to electrical systems, and more particularly to a protective circuit for automotive electrical systems of the type which include a self-rectifying A.C. generator, also known as an alternator.

In recent years, the common D.C. generator in automotive electrical systems has often been replaced with a self-rectifying A.C. generator, known as an alternator, which is designed to provide substantially full charging current at engine idling speeds. The output rectification of the alternator is usually accomplished by a plurality of interconnected silicon diode rectifiers which exhibit very low resistance when subjected to current of normal battery charging polarity, but high resistance at the opposite polarity. It is known that if either a battery charger or booster battery is connected in reverse polarity to such systems or if the battery of the vehicle is accidentally placed into the system in reverse polarity, a current flow of much greater than designed quantities may result causing parts or all of the silicon diode rectifier system to fail. In some instances, the diodes fail "short" permitting current flow to overheat the wiring in the automobile with the consequent fire hazard. At best, the alternator must be repaired or replaced before the automobile can be normally operated.

It is well known in the art that the prevention of excess current flow may be accomplished by the connection of fuses or similar current-limiting devices in current carrying conductors. The apparent positions for including rectifier protecting fuses in alternator-equipped automotive electrical systems is either in the D.C. output conductor of the alternator or in the battery output conductor. In the latter case, the accidental battery polarity reversal will cause the fuse to open completely isolating the entire automotive electrical system from the battery and thus preventing the use of parking lights and other electrical devices which may be desperately needed on a stalled vehicle whether the battery charging system is operable or not. Placing the fuse in the D.C. output conductor of the alternator permits the remaining portions of the electrical system to remain operative, however, upon subsequent engine operation the voltage regulator in the system would not be sensitive to the alternator output and the rotation of the alternator under such conditions will cause a build-up of potential across the rectifier system far in excess of design voltage which will often cause a failure of one or more of the rectifiers.

The principal objects of the present invention are: to provide a fused circuit in an automotive alternator type electrical system which protects the alternator rectifiers from excessive current flow due to polarity reversal and also excessive voltage due to regulator inoperativeness caused by the inability to sense regulator output voltage; to provide such a circuit which is easily incorporated into exisiting electrical systems with a minimum of wiring alteration; to provide a protective device for incorporation into alternator automotive electrical systems which is simple and inexpensive in construction; and to provide such a device which is rugged and reliable in operation.

Other objects and advantages of this invention will become apparent from the following description taken in connection with the accompanying drawings wherein are set forth by way of illustration and example certain embodiments of this invention.

The figure is a schematic circuit diagram of a typical automotive alternator type electrical charging system which incorporates the circuit and device of this invention.

Referring to the drawing in more detail:

The figure illustrates an automotive electrical system having a chargeable storage battery 1 with a grounded terminal 2 and a power terminal 3. A self-rectifying A.C. generator or alternator 4 is electrically connected in the circuit for charging the battery 1 in a manner noted below. A voltage regulator assembly 5 is electrically connected in the system for controlling the voltage output from the alternator to the battery as described in greater detail hereinafter. A field relay assembly 6 includes a relay actuating coil 7 therein and a pair of normally open relay contacts 8 and 9 which close when the coil 7 is actuated.

The alternator 4 has a field winding 10 connected at opposite ends thereof through suitable slip rings 11 and 12 to the battery terminal 13 and field terminal 14 of the voltage regulator assembly 5 through conductors or lines 11' and 12'. The battery terminal 13 of the voltage regulator assembly 5 is connected by means of an electrical conductor or line 15 to the field relay assembly contact 9 electrically connecting the field 10 to the contact 9. The alternator 4 includes a stator winding 16, in the illustrated example 3-phase "Y" connected, with the output thereof connected with interconnected silicon diode rectifiers 17 in a known manner for changing the alternating output to direct current. A D.C. output conductor or line 18 connects with the contact 8 of the field relay assembly 6. The power terminal 3 of the battery 1 is connected, in the illustrated example, through an ammeter 19 to a junction block 20 by means of an electrical conductor or line 21. The junction block 20 has a plurality of electrical lines 22 connected thereto for powering the automotive headlights, parking lights and other electrical controls and devices on the automobile which must be operable whether or not the engine ignition is on. An ignition switch 23 is connected at one side thereof to the junction block 20 and at the other side thereof through an indicator light 24 to a light terminal 25 on the voltage regulator assembly 5.

A line 26 is connected at a point 27 between the ignition switch 23 and light 24 to one side of the field relay coil 7, the other side of which is grounded at 28. It is to be understood that the contacts 8 and 9 are closed (by completing a circuit through coil 7) only when the ignition switch 23 is in the "on" position. This prevents leakage from the battery through the generator field and regulator windings to ground when the automobile is not in operation. Closing contacts 8 and 9 completes a circuit between the field winding 10 and the battery 1 through the lines 11', 15 and 50 so field control can be achieved through the line 12' by the regulator assembly 5 now described.

The voltage regulator assembly 5 includes several components, in the illustrated example broadly comprising a voltage regulator portion 29, a transistor portion 30 and an indicator light relay portion 31. The light indicator relay portion 31 contains a relay having a coil 32 connected between ground at 33 and the field winding line 11' at 34 which is common with the regulator assembly battery terminal 13. The relay in the portion 31 also includes a pair of normally closed contacts 35 and 36, the former being grounded at 33, and the latter being connected to the indicator light 24. In operation, when the alternator D.C. output reaches a desired voltage, as sensed through the line 15, the contacts 35 and 36 separate turning off the indicator light 24. This constitutes a signal that the desired charging voltage from the alternator has been obtained.

The transistor portion 30 includes a transistor 37 having an emitter 38, a base 39 and a grounded collector 40, the transistor in the illustrated example being of the "PNP" type. The emitter 38 is connected through the field terminal 14 to one side of the field winding 10 and the transistor base 39 is connected to a relay contact 41 which normally engages a contact 42, the contacts 41 and 42 forming part of a relay 43 in the voltage regulator portion 29. The base 39 is also connected through a current-limiting resistor 44 to one side of an accelerator winding 45 forming a part of the relay 43. The other side of the accelerator winding 45 is connected to the field winding 10 through the line 11'. A shunt winding 46 also forms a part of the relay 43 and is connected between the line 11' and ground. A resistor 47 is connected across the emitter 38 and base 39 of the transistor 37 to prevent emitter-to-collector leakage which under high temperature conditions may interfere with transistor operation. In operation, when the D.C. output of the regulator, as detected at the regulator battery terminal 13, is below that desired, the contacts 42 and 41 will be closed forward biasing the base emitter junction to ground and current will flow from the emitter to ground through the collector and also through the contacts 41 and 42 to ground through the base. It is noted that the emitter receives a positive potential through line 12' from the field winding 10 which is connected through line 11', 15, contacts 8 and 9, fuse 51 and line 50 to the positive terminal 3 of the battery 1. The collector is always negative through a ground connection to the negative terminal 2 of the battery 1. When, however, the desired voltage is experienced at the battery terminal 13 as determined by the pull exerted by the regulator relay spring 48, sufficient magnetic force will be created by the shunt winding 46 to open the contacts 41 and 42, eliminating the forward bias of the base-emitter junction and thus preventing current flow through the field winding 10.

The accelerator winding 45 carries no current when the contacts 42 and 41 are open, reducing the magnetic pull created thereby and allowing the spring 48 to reclose the contacts at a faster rate. When the contacts 41 and 42 are closed, the magnetic pull created by the accelerator winding 45 is added to that created by the shunt winding 46, speeding the opening of the contacts. The operation of the winding 45, therefore, is to accelerate the opening and closing of the contacts 41 and 42, thus increasing the control sensitivity of the voltage regulator. A suitable diode 49 is connected between the field terminal 14 and battery terminal 13 to prevent inducing a high voltage across the field coil upon rapid interruption of the current flow therethrough which could otherwise damage the transistor 37.

The reduction of field current, as controlled by the regulator 5, causes an immediate reduction in the voltage output of the alternator. The current interruption to the field winding may occur many times per second. When the ignition switch 23 is off, the contacts 8 and 9 are open, interrupting the connection between the alternator output line 18 and the line 15 which prevents the battery excitation as well as alternator output excitation of the field windings.

In conventional alternator type automotive electrical systems, the regulator D.C. output line 18 is directly connected to the junction block 20 which is, in turn, connected to the battery. In accordance with this invention, the regulator output line 18 is connected to the contact 8 of the field relay assembly 6 and the line 18 connects to the battery by means of an additional electrical conductor or line 50 connected between the battery line 21 and the line 18. A fuse 51 is connected into the line 50 and is preferably rated approximately 5 amperes above the rated D.C. output of the alternator 4. For convenience, the fuse 51 is preferably contained in the field relay assembly 6 and the line 50 connects to the output line 18 within the assembly 6.

In illustrating the operation of this invention, assume that the battery 1 is accidentally installed with reverse polarity or a battery charger is hooked up to the battery terminals with the incorrect polarity or a booster battery is hooked up to the battery terminals with the wrong polarity. In this event, a large current may flow through the rectifier 17 which, upon reaching dangerous proportions, will melt or blow the fuse 51, disconnecting the line 18 from the battery line 21. This interrupts the current flow before damage occurs to the rectifiers 17. Assuming the error has been recognized but a fuse similar to 51 is not available for replacement, the subsequent correct polarity connection of a battery, booster or battery charger will permit the starting and operation of the automobile by virtue of the uninterrupted line 21 through which current excites the various electrical devices connected to the junction block 20. Without the fuse 51 in the line 50, the battery cannot excite the field winding 10; however, upon operation of the automobile, the rotation of the alternator may result in self-excitation due to residual magnetism which results in an increasing output on the line 18 which, by means of the line 15, further excites the field winding 10 for building up alternator output voltage. With the circuit configuration of this invention, however, this self-excitation is not dangerous to the alternator since the voltage regulator 5 continues to be operable to control field current and thereby prevent excess voltage across one or more of the rectifiers 17.

The positioning of the fuse 51 as noted hereinabove protects the alternator from an excess current flow through the rectifiers and also protects the rectifiers against excess voltage due to absence of regulator control while avoiding the complete shutdown of the electrical system due to the blowing of a safety fuse.

It is to be understood that while one form of this invention has been illustrated and described, it is not to be limited to the specific form or arrangement of parts herein described and shown except insofar as such limitations are included in the claims.

What I claim and desire to secure by Letters Patent is:

1. An automotive electrical system having a chargeable storage battery with a grounded terminal and a power terminal, an alternator for charging said battery, a voltage regulator for controlling the voltage output from said alternator to said battery, and a field relay having an actuating coil and a pair of normally open contacts, said alternator having a field winding and a stator winding, said stator winding including a rectifier for changing the alternating current output of said stator winding to direct current, said regulator having a first terminal and a second terminal and interconnected voltage regulator components responsive to a predetermined voltage at said first terminal to block current flow between said second terminal and ground, a first conductor interconnecting said first terminal and one side of said field winding and one of said field relay contacts, a second conductor connecting said second terminal and the other side of said field winding, a third conductor connecting the other of said field relay contacts and the output terminal of said rectifier, a fourth conductor connecting the power terminal of said battery to said field relay actuating coil, an ignition switch for selectively interrupting said fourth conductor for opening said contacts, for selectively preventing current flow from said power terminal to said regulator first terminal and to said field winding to prevent drain on said battery when said ignition switch is open, a fifth conductor connecting said third conductor to said fourth conductor between said battery power terminal and said ignition switch, and a fuse in said fifth conductor, whereby an excessive current flow through said fifth and third conductors and rectifier causes said fuse to interrupt said fifth conductor, said third conductor retaining conducting ability to impress a regulating voltage through said first conductor onto said first terminal during subsequent generator operation without replacing said fuse.

2. The system as set forth in claim 1 wherein said rectifier comprises a plurality of interconnected silicon diodes.

3. The system as set forth in claim 1 wherein said voltage regulator components include a transistor connected between ground and said second terminal for selectively blocking field current.

References Cited by the Examiner
UNITED STATES PATENTS

| 2,747,106 | 5/1956 | Heath | 307—108 X |
| 3,219,903 | 11/1965 | Larson | 320—25 X |
| 3,241,031 | 3/1966 | Rover | 320—25 X |

MILTON O. HIRSHFIELD, *Primary Examiner.*

J. J. SWARTZ, *Assistant Examiner.*